Patented Jan. 30, 1945

2,368,464

UNITED STATES PATENT OFFICE 2,368,464

PROCESS OF REFINING ANTITOXINS

Tillman D. Gerlough, Highland Park, N. J., assignor to E. R. Squibb & Sons, New York, N. Y., a corporation of New York No Drawing. Application August 3, 1942, Serial No. 453,417

6 Claims. (Cl. 167—78)

This invention relates to the refining of antitoxins (which term, as employed herein, embraces antiviruses and antivenoms and similar biological products).

In the refining of antitoxins, antitoxic body fluids (inter alia, antitoxic serum and antitoxic plasma) are treated to separate the antitoxic protein (pseudoglobulin and associated antibodies) from the non-antitoxic (relatively inactive) protein, such as euglobulin, albumin, and non-antitoxic pseudoglobulin. Such separation is usually effected by processes essentially comprising fractional precipitation of the different proteins in the antitoxic body fluid with salts (commonly ammonium sulfate) in various concentrations. Antitoxins have also been refined by the so-called "digestion" processes, i. e., by processes essentially comprising selective digestion of the antitoxic body fluid with a proteolytic enzyme under certain conditions, and these processes possess a number of advantages; thus, they result in a higher degree of refinement and/or concentration, and the thus-refined antitoxin is less viscous and more readily absorbed and produces less reaction.

It is the object of this invention to provide a simple and efficient process, especially an improved digestion process, of refining antitoxins.

In the practice of this invention, the antitoxic body fluid (either native or partially-purified) is subjected to digestion with a proteolytic enzyme at a temperature substantially below room temperature, and preferably at a pH no higher than about 2.7. Under these conditions, the digestion is highly efficient, proceeding rapidly and with a high degree of selectivity. The antitoxic protein is then recovered from the digestion product; preferably, recovery is effected by removing a non-antitoxic protein fraction from the digestion product and, if desired, further purifying and/or concentrating the antitoxic protein fraction. Such further purification may be effected, for example, by salting-out and dialysis in the usual manner, or by treatment with a polyuronide as described and claimed in Gerlough Patent No. 2,161,861, dated June 13, 1939.

Preferably, the antitoxic body fluid is diluted several times with cold water before digestion, and digested with pepsin at a temperature of about 0 to 10° C. and a pH of about 1.8 to 2.7 for a period of about 1 to 3 hours; and preferably, also, the digestion product is heated (at a pH of about 4 to 5 and to a temperature of about 50 to 60° C.) to coagulate non-antitoxic protein and thus facilitate its separation.

The following examples are illustrative of the invention:

Example 1

(a) 52.2 liters citrated antidiphtheric horse plasma containing 0.4% phenol is diluted with 109 liters of water containing sufficient chopped ice to lower the temperature of the mixture to about 0.5° C. and maintain the temperature at about 0.5 to 1.0° C. for about two hours. Then 330 g. pepsin (1:10,000) is dissolved in 2 liters water and added to the mixture, followed by 12 liters of an aqueous solution of hydrochloric acid made up from 1350 cc. of the concentrated acid, and then by 400 cc. toluene (which not only extracts lipoid material during the subsequent heating step but also acts as a preservative), the pH of the resulting mixture being about 2.4 to 2.5. After digestion has proceeded for about two hours, 350 g. sodium citrate buffer is added, followed by 500 cc. 10-normal NaOH solution (which substantially arrests digestion at the then temperature of about 0.5 to 1.0° C.). 58 liters saturated ammonium sulfate solution is then added, followed (if necessary) by sufficient 10-normal NaOH solution to adjust the pH to 4.4 to 4.5.

(b) This digestion product is transferred to a number of stainless-steel vessels, and about 400 cc. more toluene is distributed in the vessels, which are placed in hot water; and the digestion product is stirred continuously, the temperature being rapidly raised to about 55° C. and maintained thereat for about 30 minutes. The product is then chilled to about 20° C. in about 45 minutes (e. g., by placing the vessels in an ice bath), kept in an ice box for about 12 to 16 hours to reduce the temperature to about 10 to 12° C., and filtered cold (with a filter press). The filtrate is neutralized with the required amount of solid NaHCO₃, and the resulting precipitate removed.

(c) The filtrate (a solution of antitoxic protein) is made 60% saturated with ammonium sulfate (by addition of solid ammonium sulfate), and the resulting precipitate is filtered off, pressed, and dialyzed for about 3 days against cold water. The water-insoluble fraction is removed by diluting the concentrate (obtained on dialysis) with about 6 to 7 volumes of water containing 0.2% phenol, and filtering; the filtrate is made about 60% saturated with ammonium sulfate; and the resulting precipitate is filtered off, pressed, and dialyzed. The thus-obtained concentrate, preserved with about 0.25% phenol and 1:20,000 sodium ethyl mercuri thiosalicylate, is a highly-refined and concentrated, readily-absorbed diphtheria antitoxin.

*Example 2*

Antidiphtheric horse plasma containing about 1.2% sodium citrate and 0.4% phenol is diluted with an equal volume of water and saturated ammonium sulfate solution is added. The fraction precipitating below 26% of saturation is discarded, and that precipitating between 26 and 50% of saturation is filtered off and dissolved in an equal volume of water. It is a crude concentrate, containing practically all of the globulin in the plasma, and having about 1.3 to 1.4 times the purity of the plasma (units per gram protein).

A volume of the crude concentrate containing about 86 g. protein (equivalent to 1600 cc. of the plasma) is made up to a volume of 4 liters with water containing sufficient chopped ice to lower the temperature of the mixture to about 1 to 5° C., and pepsin (1:10,000), freshly dissolved in cool water, is added in a ratio of pepsin to protein of 1:10 to 1:15; and the pH of the mixture is immediately adjusted to about 2.1 to 2.4 by addition of the requisite quantity of hydrochloric acid. The low temperature is maintained by placing the digestion mixture in an ice chest of about the same temperature. After digestion for about 3 hours, 100 cc. of 10% sodium citrate solution is added, and the pH is adjusted to about 4.1 to 4.2 with 2-normal NaOH solution. The solution is then made with 25 to 30% saturated with ammonium sulfate (by addition of saturated ammonium sulfate solution), and the pH is adjusted, if necessary, to about 4.2 to 4.6. After adding 30 cc. toluene (as a preservative), the mixture is transferred to a Pyrex balloon flask, heated rapidly in a water bath (about 80 to 90° C.) to about 55–60° C. and held at that temperature for about one hour, stirring continuously while heating. The mixture is then immediately filtered directly into a flask containing the requisite amount of solid NaHCO₃ for neutralization, the resulting precipitate is removed, and the filtrate treated as described in Example 1(c) to further purify and/or concentrate the antitoxin.

*Example 3*

240 liters of cold (4° C.) gas gangrene antitoxic plasma is diluted with 480 liters of cold (5° C.) distilled water, and 6.6 g. pepsin (1:10,000) is added for each liter of the original plasma. The pH is immediately adjusted to 2.5 by adding strong hydrochloric acid; and after digestion has proceeded for 90 minutes (at 5 to 6° C.), the pH of the digestion product is adjusted to about 4.3 to 4.5 by addition of strong sodium hydroxide solution, and ammonium sulfate is added to a concentration of 25% of saturation. The pH is then readjusted (if necessary) to about 4.3 to 4.5, and the digestion product is agitated, heated to 55° C. in a half hour, and maintained at that temperature for a half hour. The heat-treated digestion product is then chilled to 12° C. in a half hour, and filtered through a filter press; sufficient solid ammonium sulfate is added to the filtrate to make it 60% saturated; and the resulting precipitate is filtered off, dissolved in 180 liters water, and reprecipitated by adding a saturated solution of ammonium sulfate to make a 55% saturated solution. The precipitate is filtered off, pressed to remove excess mother liquor, and dialyzed for 3 days in a cold room, yielding 25 liters of a highly-refined and concentrated gas gangrene antitoxin.

*Example 4*

Antidiphtheric horse plasma containing about 1.2% sodium citrate and 0.4% phenol is partially refined by either a salting-out process or by the polyuronide process (of Patent No. 2,161,861) to obtain a concentrated antitoxic globulin having about 5 times the potency and about 2.5 to 2.7 times the purity of the plasma. A volume of the concentrate containing about 60 to 66 g. protein is made up to a volume of 3 liters with water containing sufficient chopped ice to lower the temperature of the mixture to about 1 to 5° C., and digested with pepsin as described in Example 2(a), except that the toluene is omitted.

*Example 5*

The procedure of Example 4 is modified by effecting the digestion at a pH of about 3.0 to 3.2 and at a temperature of about 2 to 3° C. for several days; a good yield of refined antitoxin is obtained.

*Example 6*

The digestion product obtained in Example 1(a) is further purified by treatment with an absorbent (such as an alkaline-earth-metal phosphate or charcoal, or a mixture thereof), preferably with finely-divided tricalcium phosphate, which is a good absorbent for pepsin and a preferential precipitant of certain proteins but does not affect the antitoxic titre. This treatment may be effected as described in Parfentjev Patent No. 2,123,198, dated July 12, 1938.

*Example 7*

The procedure of Example 4 is modified by effecting the digestion at a pH of about 1.6 to 1.9 and at a temperature of about 9 to 10° C. for about 30 to 70 minutes; a good yield of refined antitoxin is obtained.

Although specifically illustrated in connection with the production of diphtheria and gas gangrene antitoxins, the invention is applicable to the production of antitoxins generally, inter alia, scarlet fever (streptococcus) antitoxin, staphylococcus antitoxin, tetanus antitoxin, perfringens antitoxin, vibrion septique antitoxin, oedematiens antitoxin, and erysipelas antitoxin. Thus, body fluids containing scarlet fever (streptococcus) antitoxin, staphylococcus antitoxin, or tetanus antitoxin may be refined by digestion with pepsin at a pH of about 2.2 to 2.4 at a temperature substantially below room temperature; preferably, the peptic digestion of antitetanic horse plasma is carried out at a pH of about 3.0 and a temperature of about 4 to 5° C. for about 18 to 24 hours. Also, although only the use of the preferred proteolytic enzyme (pepsin) is specifically illustrated, other proteolytic enzymes, inter alia, trypsin, pancreatine, and takadiastase, or mixtures thereof, may be employed in the improved digestion process of this invention.

The invention may be variously otherwise embodied within the scope of the appended claims.

I claim:

1. In the process of refining antitoxins, the step of subjecting an antitoxic body fluid to digestion with a proteolytic enzyme at a temperature substantially below room temperature and at a pH no higher than about 2.7 for a period of about 1 to 3 hours.

2. In the process of refining antitoxins, the step of subjecting an antitoxic body fluid to digestion with a proteolytic enzyme at a temperature substantially below room temperature and at a pH of about 1.8 to 2.7 for a period of about 1 to 3 hours.

3. The process of refining antitoxic body fluids which comprises treating a native antitoxic fluid to obtain a concentrated antitoxic globulin fraction, subjecting the globulin fraction to digestion with a proteolytic enzyme at a temperature substantially below room temperature and at a pH no higher than about 2.7 for a period of about 1 to 3 hours, and recovering the antitoxic protein from the digestion product.

4. The process of refining antitoxic plasma which comprises subjecting the diluted antitoxic plasma to digestion with pepsin at a temperature of about 0 to 10° C. and a pH of about 1.8 to 2.7 for a period of about 1 to 3 hours, and recovering the antitoxic protein from the digestion product.

5. In the process of refining diphtheria antitoxin, the step of subjecting an antidiphtheric horse plasma to digestion with a proteolytic enzyme at a temperature substantially below room temperature and at a pH no higher than about 2.7 for a period of about 1 to 3 hours.

6. In the process of refining gas gangrene antitoxin, the step of subjecting gas gangrene antitoxic plasma to digestion with a proteolytic enzyme at a temperature substantially below room temperature and at a pH no higher than about 2.7 for a period of about 1 to 3 hours.

TILLMAN D. GERLOUGH.